(12) United States Patent
Greenberger et al.

(10) Patent No.: US 11,172,425 B2
(45) Date of Patent: Nov. 9, 2021

(54) BEACON PLACEMENT AND DISTRIBUTION

(71) Applicant: INTERNATIONAL BUSINESS MACHINES CORPORATION, Armonk, NY (US)

(72) Inventors: Jeremy A. Greenberger, San Jose, CA (US); Jana H. Jenkins, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 16/420,563

(22) Filed: May 23, 2019

(65) Prior Publication Data

US 2019/0281529 A1    Sep. 12, 2019

Related U.S. Application Data

(63) Continuation of application No. 15/214,788, filed on Jul. 20, 2016, now Pat. No. 10,356,692.

(51) Int. Cl.
| | |
|---|---|
| *H04W 40/24* | (2009.01) |
| *H04W 16/22* | (2009.01) |
| *H04W 64/00* | (2009.01) |
| *H04W 4/021* | (2018.01) |
| *H04L 29/08* | (2006.01) |

(52) U.S. Cl.
CPC ........ *H04W 40/244* (2013.01); *H04L 67/10* (2013.01); *H04W 4/021* (2013.01); *H04W 16/22* (2013.01); *H04W 64/003* (2013.01)

(58) Field of Classification Search
CPC ....... H04W 16/22; H04W 4/22; H04W 4/021; H04W 40/244; H04W 64/003; H04W 16/20; H04L 67/10
USPC ........................................................ 455/422
See application file for complete search history.

(56) References Cited

U.S. PATENT DOCUMENTS

| | | | |
|---|---|---|---|
| 8,543,110 | B2 | 9/2013 | Oh et al. |
| 8,738,024 | B1 | 5/2014 | Kerr et al. |
| 9,179,435 | B2 | 11/2015 | Lin et al. |
| 2006/0083366 | A1* | 4/2006 | Aoyama ............ G06Q 30/0283 379/114.01 |

(Continued)

OTHER PUBLICATIONS

Khan et al, "Wireless Sensor Networks: Current Status and Future Trends", CRC Press, Apr. 21, 2016, p. 196 and 208, 2 pages.

(Continued)

*Primary Examiner* — Farid Seyedvosoghi
(74) *Attorney, Agent, or Firm* — Daniel Yeates; Andrew D. Wright; Roberts Calderon Safran & Cole, P.C.

(57) ABSTRACT

A computer-implemented method includes receiving, by a computing device, information defining a beacon coverage area in which beacon signals transmitted by one or more beacons traverse the beacon coverage area; determining, by the computing device, the beacon coverage area based on the information defining the beacon coverage area; determining, by the computing device, beacon distribution based on the determined beacon coverage area; generating, by the computing device, a report identifying information regarding the beacon distribution; and storing or outputting, by the computing device, the report identifying information regarding the beacon distribution.

19 Claims, 10 Drawing Sheets

(56) References Cited

U.S. PATENT DOCUMENTS

| | | | |
|---|---|---|---|
| 2007/0055565 A1* | 3/2007 | Baur | G06Q 30/0267 705/14.53 |
| 2007/0165553 A1* | 7/2007 | Steinmann | G06Q 10/10 370/315 |
| 2008/0294487 A1* | 11/2008 | Nasser | G06Q 30/0203 705/7.32 |
| 2009/0140926 A1 | 6/2009 | Traster | |
| 2010/0298022 A1* | 11/2010 | Karim | H04W 24/02 455/522 |
| 2011/0215969 A1* | 9/2011 | Hwang | G01S 5/06 342/463 |
| 2013/0163425 A1 | 6/2013 | Hughes | |
| 2013/0324076 A1* | 12/2013 | Harrang | H04W 28/0284 455/405 |
| 2014/0274125 A1 | 9/2014 | Sendonaris et al. | |
| 2015/0103685 A1* | 4/2015 | Butchko | H04L 41/147 370/252 |
| 2015/0177006 A1 | 6/2015 | Schulz et al. | |
| 2015/0312774 A1* | 10/2015 | Lau | H04W 24/10 455/446 |
| 2015/0327022 A1 | 11/2015 | Lin et al. | |
| 2015/0334676 A1* | 11/2015 | Hart | H04W 64/003 455/456.1 |
| 2015/0365790 A1 | 12/2015 | Edge et al. | |
| 2016/0085429 A1 | 3/2016 | Newby et al. | |
| 2016/0088443 A1 | 3/2016 | Kostka et al. | |
| 2016/0165472 A1 | 6/2016 | Gopalakrishnan et al. | |
| 2016/0323803 A1* | 11/2016 | Friday | H04B 17/318 |

OTHER PUBLICATIONS

Smith, "How beacons—small, low-cost gadgets—will influence billions in US retail sales", http://www.businessinsider.com/beacons-impact-billions-in-reail-sales-2015-2, Beacons Impact Billions In Retail Sales—Business Insider, Accessed Apr. 1, 2016, 3 pages.

Tarantola, "JFK installs phone-tracking beacons to better estimate wait times", engadget, http://www.engadget.com/2015/08/20/jfk-installs-phone-tracking-beacons-to-better-estimate-wait-tim, Accessed Accessed Apr. 1, 2016, 2 pages.

Ito et al, "Navigation System for Sightseeing using BLE Beacons in a Historic Area", SAMI 2016, IEEE 14th International Symposium on Applied Machine Intelligence and Informatics, Jan. 21-23, 2016, 6 pages.

Byun et al, "S-Beacon: Next Generation BLE Beacon Solution for Enhanced Personalization", 2016 IEEE International Conference on Consumer Electronics (ICCE), 2016, p. 166-167, 2 pages.

Mori et al, "Experiments of position estimation by BLE beacons on actual situations", 2015 IEEE 4th Global Conference on Consumer Electronics (GCCE), 2015, p. 683 to 684, 2 pages.

Mell et al., "The NIST Definition of Cloud Computing", NIST, Special Publication 800-145, Sep. 2011, 7 pages.

List of IBM Patents or Patent Applications Treated as Related, May 22, 2019, 1 page.

* cited by examiner

700

Create New Notification

Select the devices to send notification to: Customers

Message to send: 50% off all shoes this week!

Select location in which to send notification: Shoe Department

Enabled: X   SAVE

FIG. 7

BEACON PLACEMENT AND DISTRIBUTION

BACKGROUND

The present invention generally relates to distribution of wireless beacons and, more particularly, to distribution of wireless beacons based on user traffic and defined coverage areas.

A wireless beacon (also referred to as a "beacon") is a device that wirelessly transmits a signal including an identifier. Beacons may be used for location identification of user devices (e.g., smart phones, laptops, tablets, etc.). For example, a user device may receive an identifier from a wireless signal transmitted by a beacon whose location is fixed and known. The user device may provide the identifier to a server device, which may in turn, look up the identifier to determine a location of the user devices based on the known location of the beacon associated with the identifier.

Beacons may be used in conjunction with ad campaigns in which corresponding content is provided to a user based on the user's location. For example, merchants may implement ad campaigns in which a user may receive content based on the user's location (e.g., a promotion for products associated with a particular section of the merchant's facility in which the user device is located).

Beacons have a particular transmission range in which a user device may receive signals transmitted by the beacon. The transmission range can be affected by obstructions (e.g., walls, shelves, etc.), beacon battery power, or the like. A location determination system (e.g., associated with an ad campaign or content distribution system) that employs the use of beacons is only effective when the collective transmission range of beacons provides adequate coverage for a given area. However, certain areas (e.g., in a merchant facility) may have insufficient coverage while other areas may have excess coverage. Further, the area (e.g., within a merchant facility) in which location determination is needed may dynamically change based on user traffic patterns or based on changing coverage areas (e.g., areas in which content for an ad campaign is to be provided). For example, content for an ad campaign may not reach all users within a particular area if beacon coverage does not cover the area associated with the ad campaign. In particular, insufficient beacon coverage may prevent a user device from receiving a beacon signal, which in turn, would prevent the user device from receiving content.

SUMMARY

In an aspect of the invention, a computer-implemented method includes receiving, by a computing device, information defining a beacon coverage area in which beacon signals transmitted by one or more beacons traverse the beacon coverage area; determining, by the computing device, the beacon coverage area based on the information defining the beacon coverage area; determining, by the computing device, beacon distribution based on the determined beacon coverage area; generating, by the computing device, a report identifying information regarding the beacon distribution; and storing or outputting, by the computing device, the report identifying information regarding the beacon distribution.

In an aspect of the invention, there is a computer program product for distributing and placing beacons in a facility to provide beacon coverage within a beacon coverage area. The computer program product comprises a computer readable storage medium having program instructions embodied therewith, the program instructions executable by a computing device to cause the computing device to: receive information for defining the beacon coverage area in which beacon signals transmitted by one or more beacons traverse the beacon coverage area; determine the beacon coverage area based on the information for defining the beacon coverage area; determine beacon placement based on the determined beacon coverage area; generate a report identifying information regarding the beacon placement; and store or output the report identifying information regarding the beacon placement.

In an aspect of the invention, a system includes: a CPU, a computer readable memory and a computer readable storage medium associated with a computing device; program instructions to receive information for defining a beacon coverage area in which beacon signals transmitted by one or more beacons traverse the beacon coverage area, wherein the beacon coverage area corresponds to a targeted area for providing content associated with an ad campaign; program instructions to determine the beacon coverage area based on the information for defining the beacon coverage area; program instructions to determine beacon distribution based on the determined beacon coverage area; program instructions to generate a report identifying information regarding the beacon placement; and program instructions to store or output the report information regarding the beacon placement. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIGS. 7-10 show an example for distributing and placing beacons to cover a defined beacon coverage area in accordance with aspects of the present invention.

DETAILED DESCRIPTION

Figure 1:
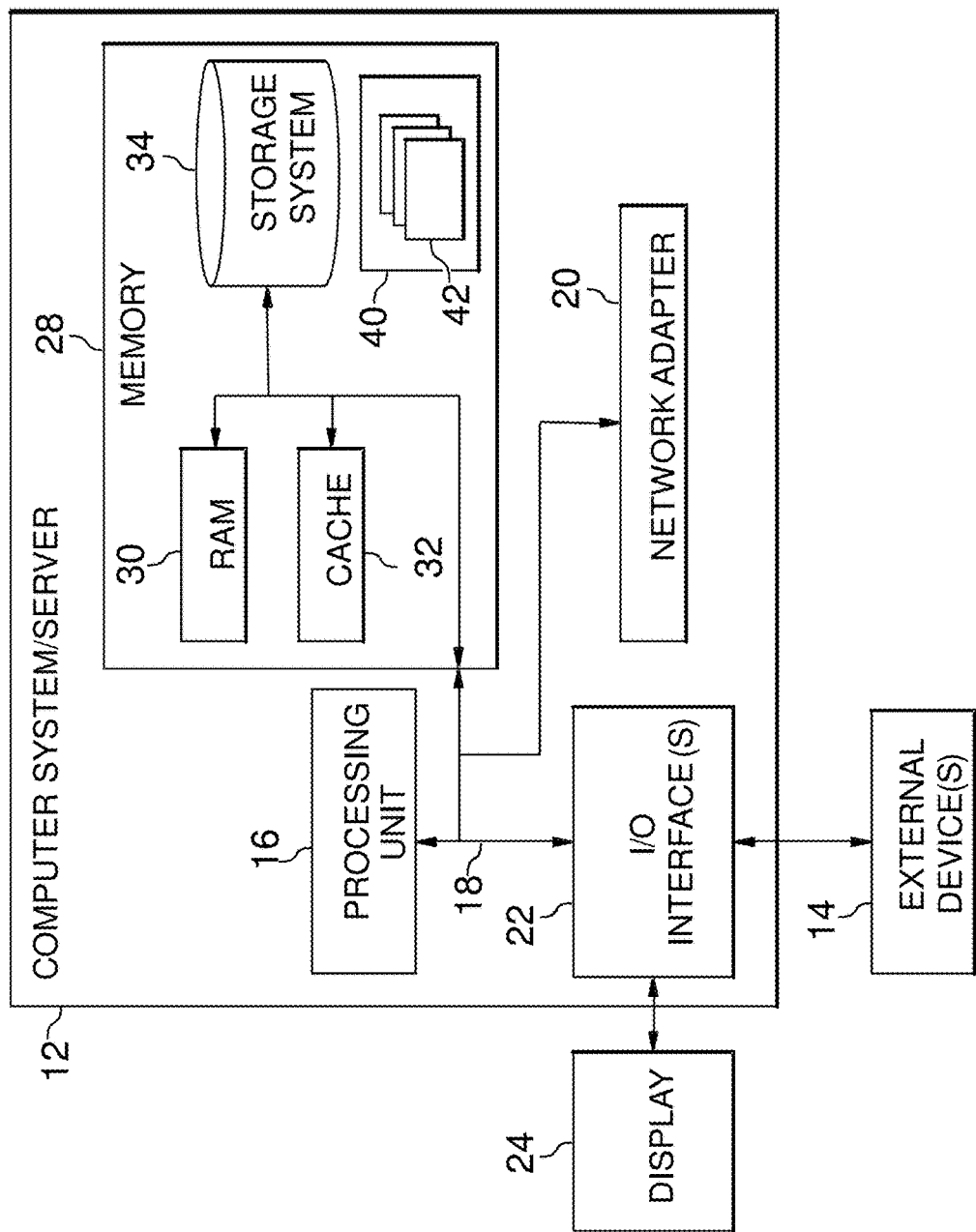
FIG. 1 depicts a cloud computing node according to an embodiment of the present invention.

The present invention generally relates to distribution of wireless beacons and, more particularly, to distribution of wireless beacons based on user traffic and defined coverage areas. Aspects of the present invention may include a system and/or method that provides information on the distribution of beacons in a manner such that adequate "beacon coverage" (e.g., beacon signal transmission coverage) is provided in defined coverage areas (e.g., a defined area in a merchant facility in which signals provided by beacons should traverse in order for content to be provided to user devices in connection with an ad campaign). In embodiments, beacons may be redistributed from one area (e.g., an area in which excess beacon coverage is present) to another area (e.g., an area in which insufficient coverage is present).

In embodiments, beacon transmission range for beacons may be determined based on various factors, such as beacon battery level, historical transmission performance in a particular area, obstructions in the area, etc. From the beacon transmission range information, optimal placement of beacons may be determined such that adequate beacon coverage is provided. Further, beacons that provide excess coverage (e.g., coverage in an area in which coverage is not needed) may be moved to areas with insufficient coverage (e.g., in a situation in which an ad campaign has moved from one section of a merchant facility to another).

As described herein, coverage areas where beacon coverage is needed may be defined by an ad campaign administrator. For example, the ad campaign administrator may define (e.g., using a user interface of an administrator computing device) a coverage area in which content is to be provided to users in a particular location (e.g., promotional advertising for particular products at a particular section of a store). Additionally, or alternatively, the coverage areas may be defined based on historical user traffic patterns. Advantageously, aspects of the present invention may ensure adequate beacon coverage which, in turn, ensures maximum distribution of content for ad campaigns.

Aspects of the present invention may provide a technical solution to the technical problem of beacon distribution. For example, aspects of the present invention may monitor and track beacon coverage (e.g., areas in which beacon signals are present) throughout a facility based on beacon signal strength information. Further, aspects of the present invention may generate recommendations for beacon distribution/redistribution based on beacon coverage and changing coverage areas (e.g., areas in which beacon coverage is needed, such as areas in which ad campaigns are implemented).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
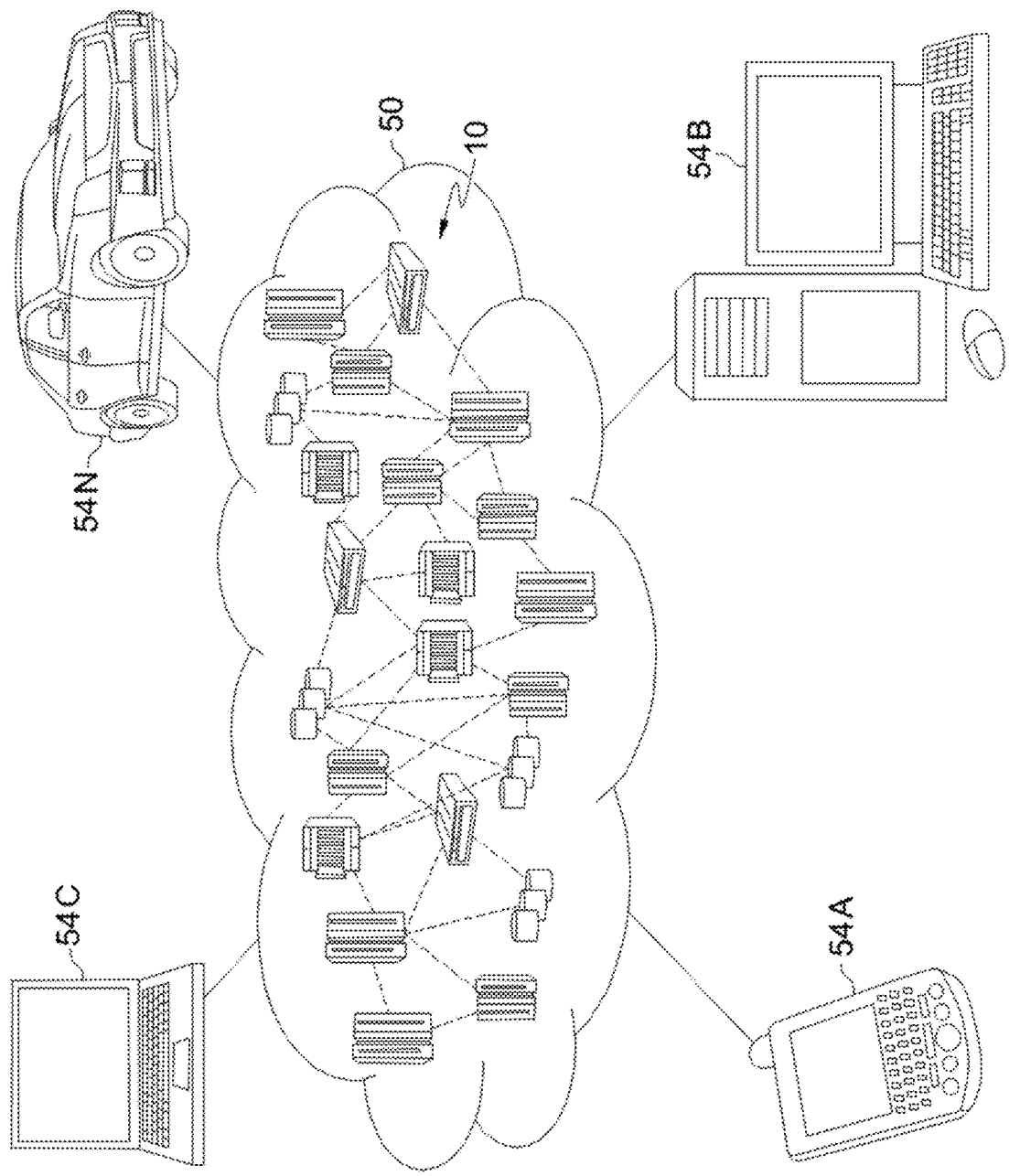
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
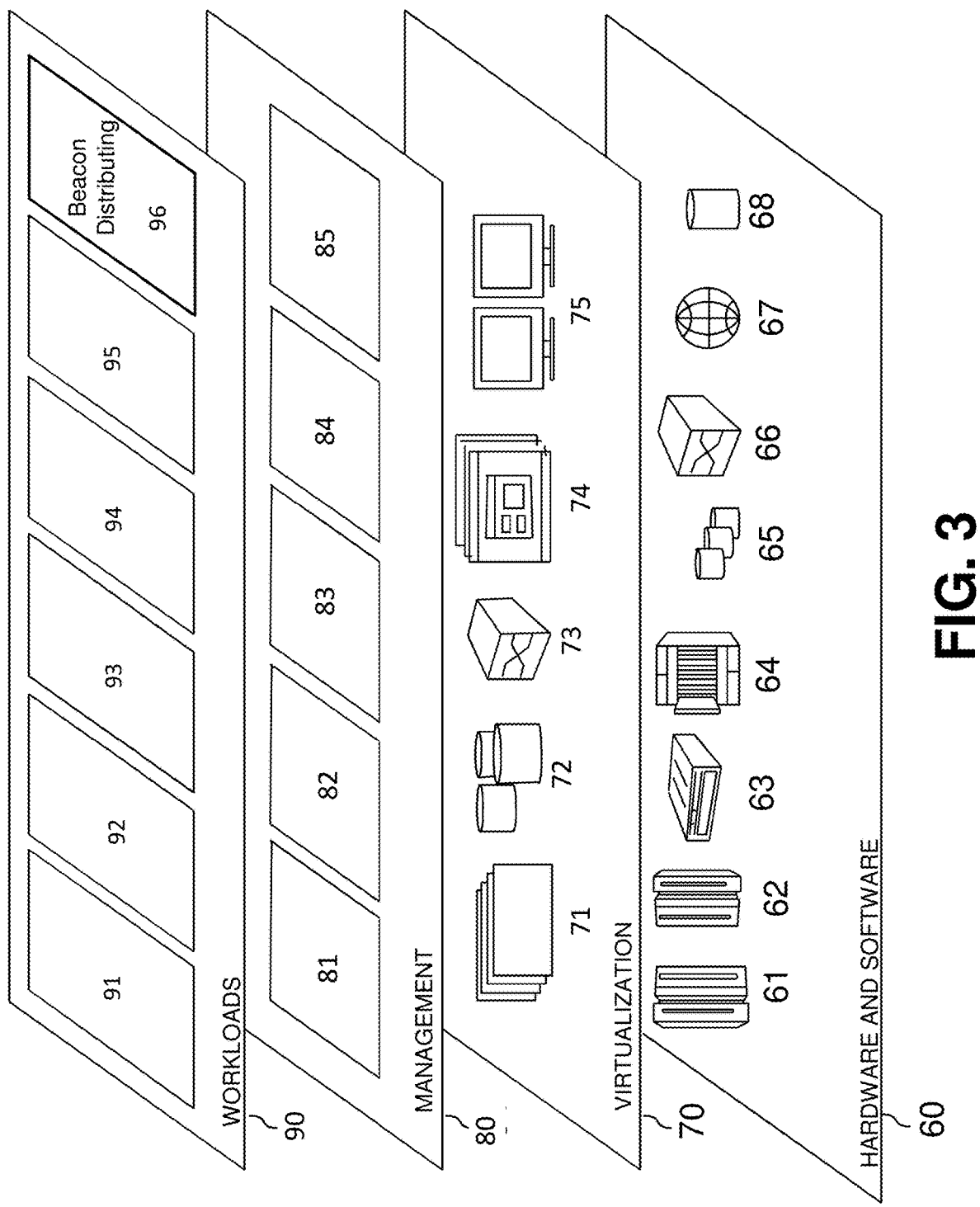
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and beacon distributing 96.

Referring back to FIG. 1, the program/utility 40 may include one or more program modules 42 that generally carry out the functions and/or methodologies of embodiments of the invention as described herein (e.g., such as the functionality provided by beacon distributing 96). Specifically, the program modules 42 may determine a coverage area, determine whether current beacon coverage is sufficient within the coverage area, determine beacon placement to provide adequate beacon coverage, determine beacon distribution among a set of beacons, and store or output beacon placement information and/or beacon distribution information. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a beacon distribution server shown in FIG. 4.

Figure 4:
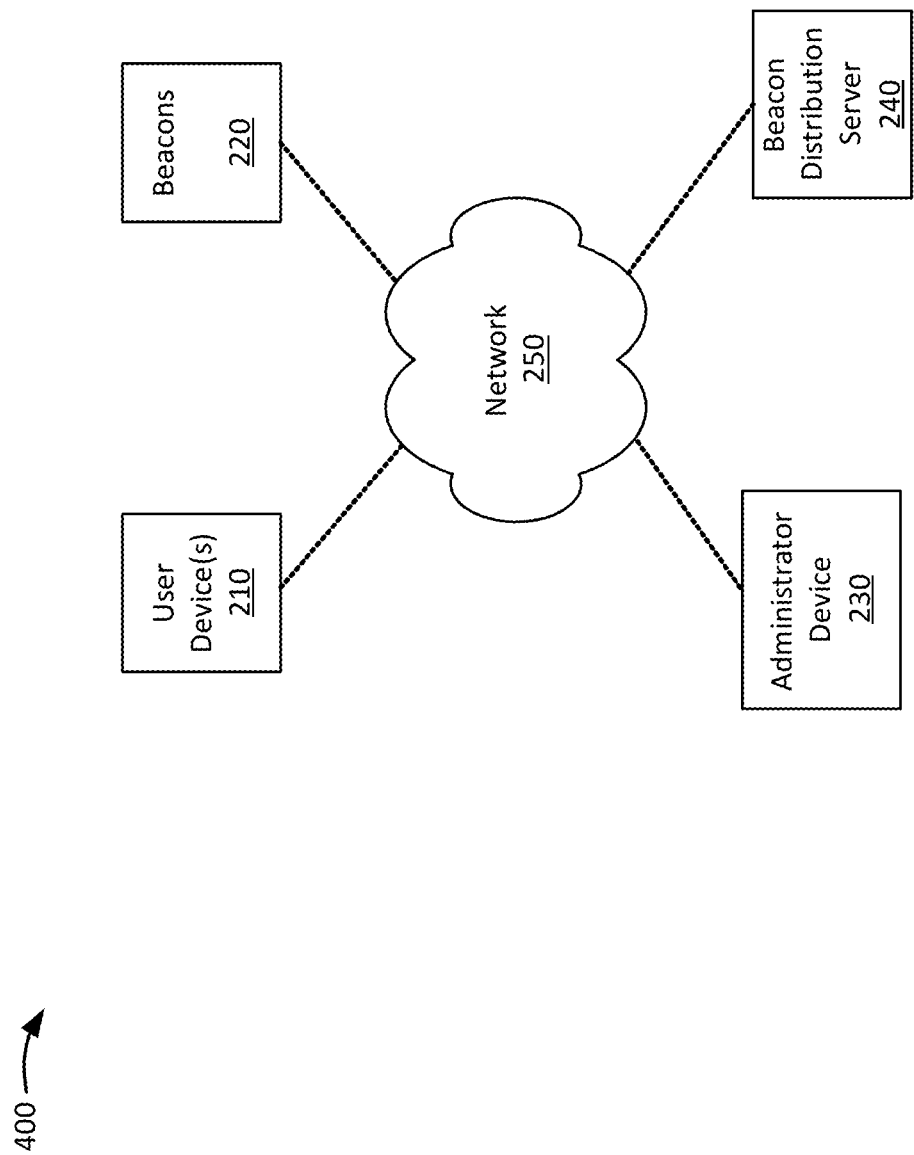
FIG. 4 shows an example environment in accordance with aspects of the present invention.

FIG. 4 shows an example environment in accordance with aspects of the present invention. As shown in FIG. 4, environment 400 may include user devices 210 (also referred singularly as "user device 210"), beacons 220, an administrator device 230, a beacon distribution server 240, and/or a network 250. In embodiments, one or more components in environment 400 may correspond to one or more components in the cloud computing environment of FIG. 2.

The user device 210 may include a computer device capable of communicating via a network, such as the network 250. For example, the user device 210 may correspond to a mobile communication device (e.g., a smartphone or a personal digital assistant (PDA)), a portable computer device (e.g., a laptop or a tablet computer), or another type of computer device. In embodiments, the user device 210 may receive beacon signals transmitted by the beacons 220. The user device 210 may provide information to the administrator device 230 corresponding to information transmitted via the beacon signals (e.g., an identifier, battery power information, etc.). As described in greater detail herein, the administrator device 230 may receive the identifier to provide the user device 210 with content associated with the identifier (e.g., in connection with an ad campaign designed to provide the user device 210 with content associated with a particular location of the beacon).

The beacons 220 may include a set of wireless transmitters that transmit radio signals (e.g., beacon signals) carrying information representing respective identifiers for each beacon 220. In embodiments, the radio signals may also carry other information, such as battery level information for each respective beacon 220. A set of beacons 220 may be associated with a particular organization, merchant, facility, etc.

The administrator device 230 may include one or more computing devices that may store information for managing a set of beacons 220. For example, the administrator device 230 may store registration information for the beacons 220. For example, the administrator device 230 may store information identifying content to provide to a user device 210 based on receiving an identifier of a particular beacon 220. In embodiments, an administrator may define the content associated with each beacon 220 (e.g., via a user interface). Further, the beacon 220 may receive boundary definitions (e.g., from the administrator via the user interface) for a boundary within which beacon coverage should be provided. For example, as described herein, the administrator device 230 may receive an instruction to implement an ad campaign within a particular defined boundary (e.g., a particular section of a store). The administrator device 230 may further receive an instruction identifying selected content to provide to user devices 210 as part of the ad campaign. The administrator device 230 may associate the selected content with the identifiers of the beacons 220. When the user device 210 is within communications range of the beacons 220, the administrator device 230 may receive an identifier (or multiple identifiers) and provide the content associated with the identifier(s) to the user device 210. In embodiments, the administrator device 230 may determine the location of the user device 210 based on the received identifier (e.g., in embodiments when the location of the beacon 220 associated with the identifier is fixed and known). The administrator device 230 may include one or more of the components of the computer system/server 12 of FIG. 1.

The beacon distribution server 240 may include one or more computing devices that may determine placement for the beacons 220 and the manner in which the beacons 220 should be distributed in order for the transmission range of the beacons 220 to collectively cover a defined coverage area (e.g., an administrator-defined area and/or an area that is defined based on historical user traffic). As described herein, the beacon distribution server 240 may store or output information regarding beacon placement and/or beacon distribution to the administrator device 230 so that an administrator can redistribute beacons 220 from one area to another in order for the beacons 220 to adequately cover a defined coverage area. The beacon distribution server 240 may include one or more of the components of the computer system/server 12 of FIG. 1.

The network 250 may include network nodes, such as network nodes 10 of FIG. 2. Additionally, or alternatively, the network 250 may include one or more wired and/or wireless networks. For example, the network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 250 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400. Devices of the environment 400 may interconnect via wired connections, wireless connections, or a combination of wired and wireless connections.

Figure 5:
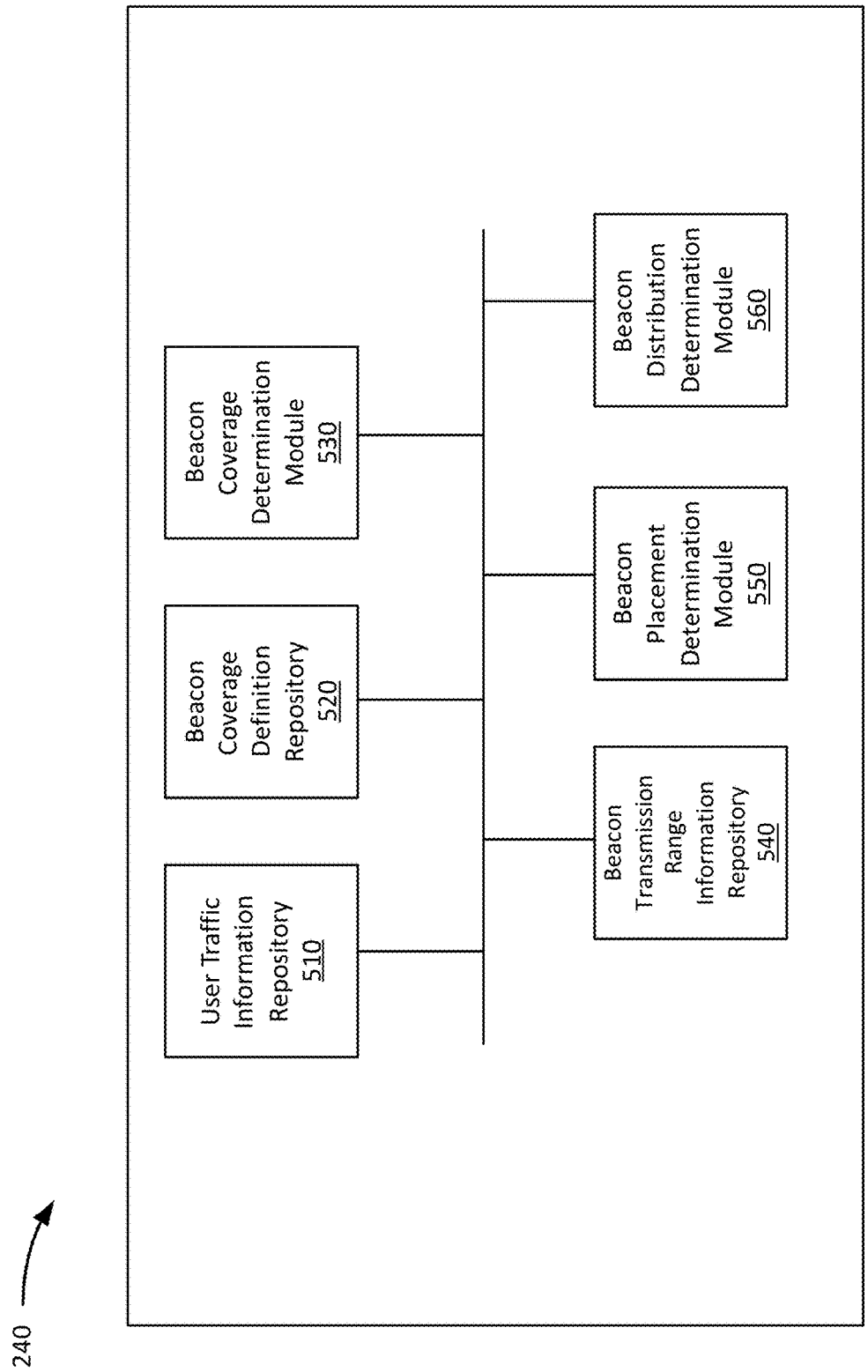
FIG. 5 shows a block diagram of example components of a beacon distribution server in accordance with aspects of the present invention.

FIG. 5 shows a block diagram of example components of a beacon distribution server 240 in accordance with aspects of the present invention. As shown in FIG. 5, the beacon distribution server 240 may include a user traffic information repository 510, a beacon coverage definition repository 520, a beacon coverage determination module 530, a beacon transmission range information repository 540, a beacon placement determination module 550, and a beacon distribution determination module 560. In embodiments, the beacon distribution server 240 may include additional or fewer components than those shown in FIG. 5. In embodiments, separate components may be integrated into a single computing component or module. Additionally, or alternatively, a single component may be implemented as multiple computing components or modules.

The user traffic information repository 510 may include a data storage device (e.g., storage system 34 of FIG. 1) that stores information regarding user traffic within a particular area (e.g., particular sections of a store or merchant facility). In embodiments, user traffic information may be obtained based on monitoring the locations of user devices 210 within the particular area over a period of time. The locations of the user devices 210 may be determined and monitored using the beacons 220. For example, as user devices 210 traverse a location (e.g., a store or merchant facility), the administrator device 230 may determine the locations of the user devices 210 based on receiving identifiers of the beacons 220 from the user devices 210. Additionally, or alternatively, the locations of the user devices 210 may be determined using another technique. In embodiments, information regarding predicted user traffic patterns may be stored by the user traffic information repository 510 without involvement of user devices 210 and/or the beacons 220. For example, predicted user traffic patterns may be based on sales activity, time of year, or the like.

The beacon coverage definition repository 520 may include a data storage device (e.g., storage system 34 of FIG. 1) that receives and stores beacon coverage area definitions identifying areas in which beacon coverage is needed (e.g., so that beacon signals are received by user devices 210 in the defined beacon coverage area). The beacon coverage definition repository 520 may receive an administrator-defined beacon coverage area from the administrator device 230. For example, an administrator may define a beacon coverage area via a user interface of administrator device 230 to indicate that beacon coverage should be present in a particular section of a store (e.g., to support an ad campaign for the particular section of the store). The beacon coverage definition repository 520 may store modifications to the beacon coverage area definitions based on changing ad campaigns (e.g., when the target for ad campaigns changes from one location to another). In embodiments, the beacon coverage definition repository 520 may delete beacon coverage area definitions after a particular period of time (e.g., after an administrator-defined or default expiration time). Further the beacon coverage definition repository 520 may store a default beacon coverage are for where beacon coverage should be provided after expiration of a defined beacon coverage area.

The beacon coverage determination module 530 may include a program module (e.g., program module 42 of FIG. 1) that determines a beacon coverage area (e.g., an area where beacon coverage should be provided) based on the beacon coverage definitions (e.g., stored by the beacon coverage definition repository 520) and/or the user traffic information (e.g., stored by the user traffic information repository 510). In embodiments, the beacon coverage determination module 530 may determine the beacon coverage area based solely on the beacon coverage definitions (e.g., so that beacon coverage is provided in the defined beacon coverage areas). Additionally, or alternatively, the beacon coverage determination module 530 may determine beacon coverage solely on anticipated user traffic (e.g., so that beacon coverage is provided at areas in which user traffic is anticipated to be relatively higher than other areas and when beacon coverage definitions are not present). Additionally, or alternatively, the beacon coverage determination module 530 may determine beacon coverage on a combination of anticipated user traffic and beacon coverage definitions (e.g., so that beacon coverage is provided at both defined areas and anticipated high-traffic areas).

The beacon transmission range information repository 540 may include a data storage device (e.g., storage system 34 of FIG. 1) that stores information regarding the transmission range of beacons 220. For example, the beacon transmission range information repository 540 may store information identifying the range of the beacons 220 at various locations in an area (e.g., a merchant facility or store). For example, a particular beacon 220 may have a transmission range at one location and a different transmission range at a different location. As described herein, the transmission range of the beacons 220 may be affected by layout of the area, obstructions in the area (e.g., shelves, merchandise, objects, etc.) The beacon transmission range information repository 540 may store information identifying the transmission range of the beacons 220 at various locations based on historical transmission information of the beacons 220 at the various locations.

In embodiments, the historical transmission information may be based on experimental data in which the transmission range is measured at various locations and provided to the beacon transmission range information repository 540 for storage. Additionally, or alternatively, the historical transmission information may be based on reported signal strengths of beacon signals received by various user devices 210 at various locations. In embodiments, the beacon transmission range information repository 540 may store battery level information for different beacons 220. The battery level information may be used to determine the transmission range for different beacons 220 (e.g., relatively lower battery levels would provide a relatively shorter transmission range). The battery information may be reported by user devices 210 that receive beacon signals in which the battery level information is included in the beacon signals.

The beacon placement determination module 550 may include a program module (e.g., program module 42 of FIG. 1) that determines the placement of beacons 220 in order to provide beacon coverage in the determined beacon coverage areas (e.g., as determined by the beacon coverage determination module 530). In embodiments, the beacon placement determination module 550 may determine the placement of the beacons 220 based on the determined beacon coverage areas and the beacon transmission range information (e.g., stored by the beacon transmission range information repository 540). For example, the beacon placement determination module 550 may execute simulations to determine optimal beacon placement in which the culmination of beacon transmission ranges cover the determined beacon coverage areas. As an example, the beacon placement determination module 550 may superimpose boundaries corresponding to the beacon transmission ranges on to a floor plan or map that defines the beacon coverage area. In embodiments, information regarding the optimal beacon placement may be provided for display. The information regarding the optimal beacon placement may be in the form of a map or floor plan (e.g., of a merchant facility or store) with graphical indicators for the placement of the beacons 220.

The beacon distribution determination module 560 may include a program module (e.g., program module 42 of FIG. 1) that determines the distribution of the beacons 220 such that beacon coverage is provided in the determined beacon coverage area. In embodiments, the beacon distribution determination module 560 may store information identifying the current location of the beacons 220, and determine that certain beacons 220 can be relocated from one location to another. For example, the beacon distribution determination module 560 may determine that certain beacons 220 should be relocated from one location that has excess beacon coverage (e.g., beacon coverage where not needed) to a location that has insufficient beacon coverage. Such a situation may arise in which a targeted location for an ad campaign changes from one location to another, or when user traffic is anticipated to change at different times of day or different times of year. In embodiments, the beacon distribution determination module 560 may determine that beacon relocation or redistribution is not needed (e.g., if the beacon coverage area is sufficiently covered by the current position of the beacons 220). In such a situation, the beacon distribution determination module 560 may output information indicating that the current beacon locations adequately cover the beacon coverage area.

When beacons 220 are relocated, beacon distribution determination module 560 may receive an indication as to the new locations from the administrator device 230 (e.g., via a user interface from an administrator that inputs the new locations of the beacons 220). Additionally, or alternatively, the locations of the beacons 220 may themselves be tracked automatically by fixed (non-moveable and/or non-moving) beacons, GPS techniques, or the like. In embodiments, information regarding the beacon distribution may be provided for display with a narrative, report, and/or instruction indicating the manner in which the beacons 220 should be distributed, redistributed, and/or relocated.

Figure 6:
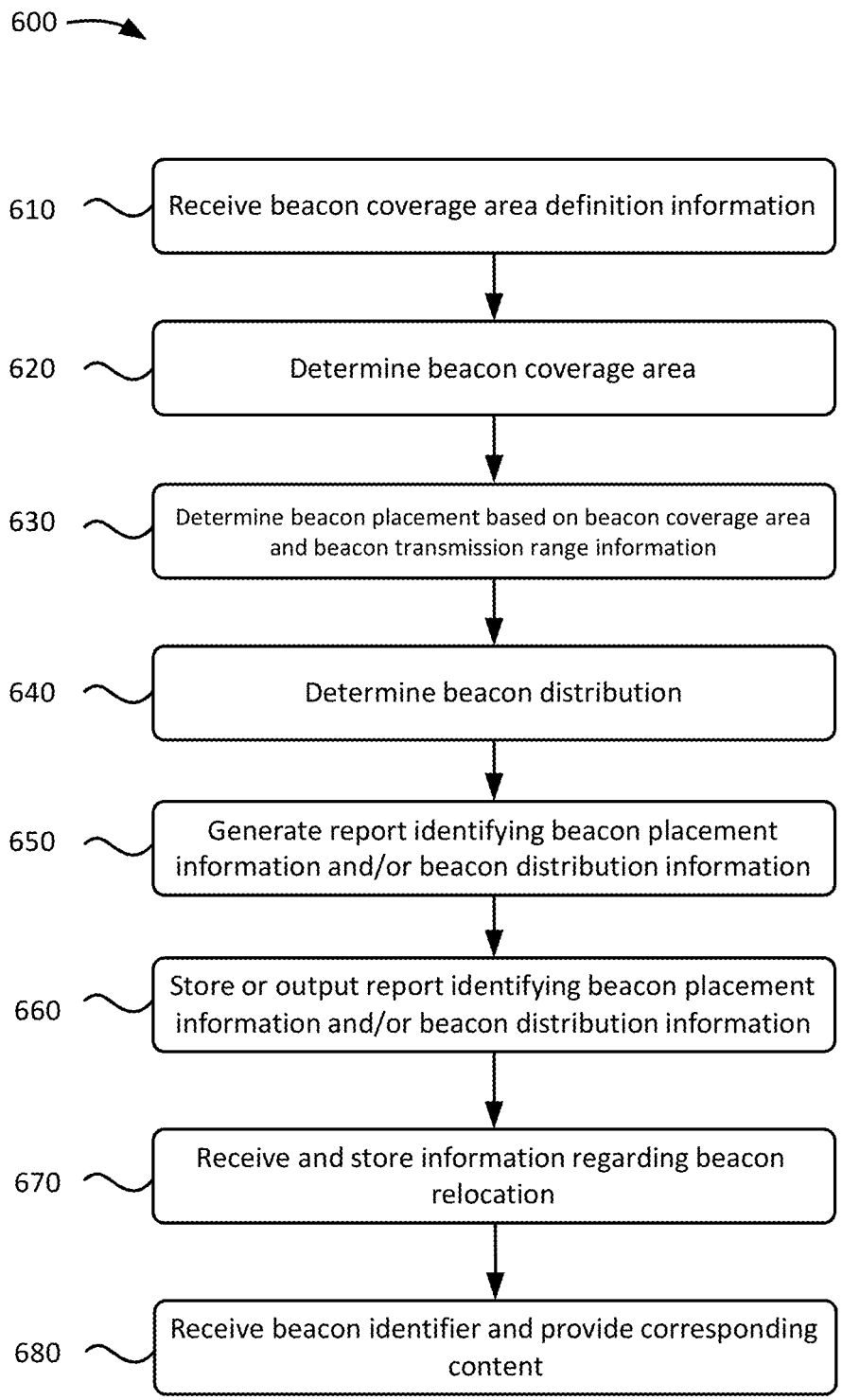
FIG. 6 shows an example flowchart for determining beacon placement and/or beacon distribution to ensure adequate beacon coverage in accordance with aspects of the present invention.

FIG. 6 shows an example flowchart for determining beacon placement and/or beacon distribution to ensure adequate beacon coverage in accordance with aspects of the present invention. The steps of FIG. 6 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 6, process 600 may include receiving beacon coverage area definition information (step 610). For example, as described above with respect to the beacon coverage definition repository 520, the beacon distribution server 240 may receive an administrator-defined beacon coverage area from the administrator device 230. For example, an administrator may define a beacon coverage area via a user interface of administrator device 230 to indicate that beacon coverage should be present in a particular section of a store (e.g., to support an ad campaign for the particular section of the store). The beacon distribution server 240 may receive the beacon coverage area definitions from the administrator device 230. Additionally, or alternatively, the beacon distribution server 240 may also receive user traffic information which may be used to define a beacon coverage area.

Process 600 may also include determining a beacon coverage area (step 620). For example, as described above with respect to the beacon coverage determination module 530, the beacon distribution server 240 may determine the beacon coverage area based on the beacon coverage definitions (e.g., stored by the beacon coverage definition repository 520) and/or the user traffic information (e.g., stored by the user traffic information repository 510).

Process 600 may further include determining beacon placement based on the beacon coverage area and beacon transmission range information (step 630). For example, as described above with respect to the beacon placement determination module 550, the beacon distribution server 240 may determine the placement of the beacons 220 based on the determined beacon coverage areas and the beacon transmission range information (e.g., stored by the beacon transmission range information repository 540). For example, the beacon distribution server 240 may execute simulations to determine optimal beacon placement in which the culmination of beacon transmission ranges cover the determined beacon coverage areas.

Process 600 may also include determining beacon distribution (step 640). For example, as described above with respect to the beacon distribution determination module 560, the beacon distribution server 240 may determine that certain beacons 220 should be relocated from one location that has excess beacon coverage (e.g., beacon coverage where not needed) to a location that has insufficient beacon coverage.

Process 600 may also include generating a report identifying beacon placement information and/or beacon distribution information. For example, the beacon distribution server 240 may generate a report that identifies the beacon placement information and/or beacon distribution information. In embodiments, the report may be in the form of a map or floor plan (e.g., of a merchant facility or store) that shows the optimal placement of beacons in order for coverage to be provided in the defined beacon coverage area (with graphical indicators for the placement of the beacons 220). Additionally, or alternatively, the report may include a map or floor plan that illustrates the relocation of a beacon from one location to another. Additionally, or alternatively, the report may include a narrative that describes beacon distribution or relocation (e.g., a narrative directing an administrator to relocate a beacon 220 from one location to another).

Process 600 may further include storing or outputting the report identifying beacon placement information and/or beacon distribution information (step 660). For example, as described above with respect to the beacon placement determination module 550 and the beacon distribution determination module 560, the beacon distribution server 240 may store or output beacon placement information and/or beacon distribution information (e.g., in the form of a report). The information regarding the optimal beacon placement may be provided for display in the form of a map or floor plan (e.g., of a merchant facility or store) with graphical indicators for the placement of the beacons 220. In embodiments, the information regarding the beacon distribution may be provided for display with a narrative, report, and/or instruction indicating the manner in which the beacons 220 should be distributed, redistributed, and/or relocated.

Process 600 may include receiving and storing information regarding beacon relocation (step 670). For example, the beacon distribution server 240 may receive information regarding updated beacon locations. In embodiments, the information regarding updated beacon locations may be received from an administrator that relocates the beacons. Additionally, or alternatively, the updated beacon locations may be received from the beacons 220 themselves (e.g., in an embodiment in which beacon location is automatically tracked via GPS techniques, WI-FI® triangulation, and/or via fixed beacons). In embodiments, the updated beacon location may correspond to the beacon placement information and/or beacon distribution information. The updated information may be stored for future relocation and redistribution determinations.

Process 600 may further include receiving a beacon identifier and providing corresponding content (step 680). For example, the beacon distribution server 240 may receive an identifier for a beacon 220 when the user device 210 receives signals from the beacon in the defined beacon coverage area. The beacon distribution server 240 may provide corresponding content associated with the beacon identifier. In this way, the user device 210 may receive content when located in the defined beacon coverage area (e.g., content for an ad campaign directed to user devices 210 located in a particular area).

Process 600 may be repeated as beacon coverage area definitions change. For example, beacon coverage area definitions may change when an administrator changes the beacon coverage area (e.g., to change a targeted area for an ad campaign). Additionally, or alternatively, the beacon coverage area may change when user traffic patterns indicate that a particular area of a merchant facility is more popular than another area. Additionally, or alternatively, the beacon coverage area may change or revert back to a default beacon coverage area when an administrator-defined beacon coverage area expires. Once the beacon coverage area definitions change, a new beacon coverage area may be determined, and updated beacon distribution and placement may be determined in accordance with process 600 described above.

FIGS. 7-10 show an example for distributing and placing beacons to cover a defined beacon coverage area in accordance with aspects of the present invention. In particular, FIG. 7 shows an example for defining a beacon coverage area. The example interface 700 shown in FIG. 7 may be presented by an application of the administrator device 230. From interface 700, the administrator device 230 may receive (e.g., from an administrator) selections for a beacon coverage location (e.g., "shoe department" in a merchant facility or store), content to send to user devices 210 within the beacon coverage area (e.g., the message "50% off all shoes this week!"), and a description of user devices 210 that should receive the content (e.g., user devices 210 classified as "Customers").

Figure 8:
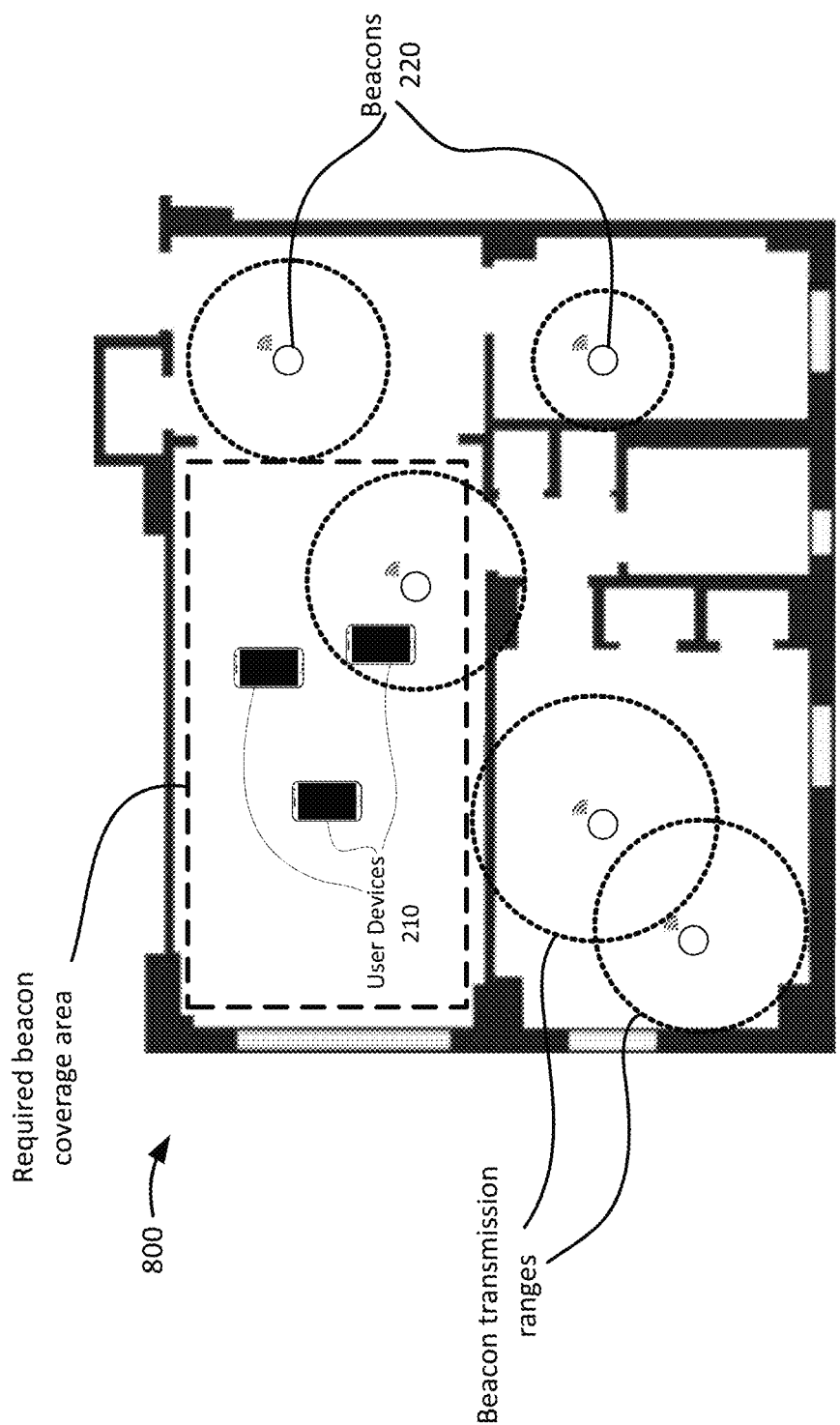
Figure 9:
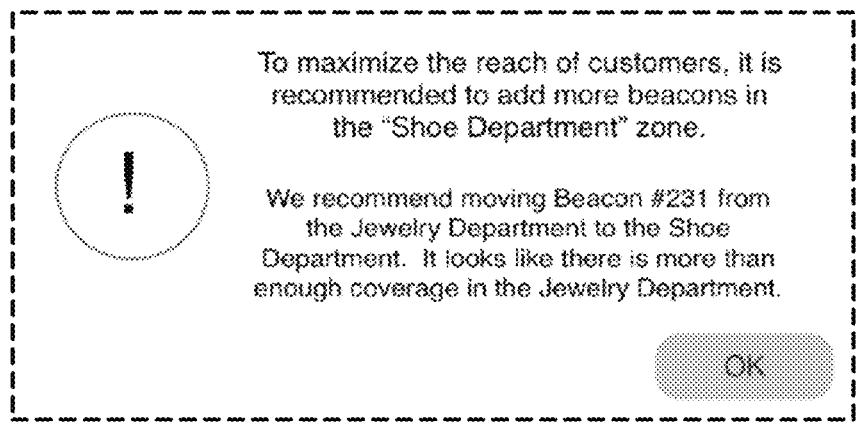

FIG. 8 shows an example illustration of current beacon transmission ranges in relation to a required beacon coverage area (e.g., as defined by an administrator as described in FIG. 7). As shown in FIG. 8, a floor plan 800 represents the merchant facility or store. A required beacon coverage area corresponds to the beacon coverage area as defined by an administrator in FIG. 7 (e.g., a shoe department of a store). The floor plan 800 identifies the current location of beacons 220 and their respective beacon transmission ranges (e.g., as stored by the beacon transmission range information repository 540). In embodiments, the information of FIG. 8 may be provided for display by the beacon distribution server 240. As can be seen from FIG. 8, the beacon transmission ranges do not fully cover the required beacon coverage area. As a result, the user devices 210 may not receive the beacon signals when in an uncovered portion of the required beacon coverage area. User devices 210 that do not enter a beacon transmission range when in the required beacon coverage area would not receive beacon signals and hence, not receive the content for the ad campaign (e.g., the message in FIG. 7). Further, user devices 210 that are in a beacon transmission range but are outside of the defined coverage area would receive the content even though the content may not be relevant for their location.

In accordance with aspects of the present invention, the beacon distribution server 240 may determine the placement of the beacons 220 in order to provide full beacon coverage in the required beacon coverage area. For example, as described above, the beacon distribution server 240 may execute simulations to determine beacon placement such that the beacon transmission ranges of all the beacons 220 cover the required beacon coverage area. As part of the simulation, the beacon distribution server 240 may consider the beacon transmission ranges at various locations of the facility based the historical performance of the beacons 220 at the various locations. For example, a particular beacon 220 may have a transmission range at one location and a different transmission range at a different location (e.g., based on the presence of obstructions, such as shelves, objects, merchandise, etc.). Also, the beacon distribution server 240 may consider the battery levels of the beacons 220 when determining the beacon placement, as the battery level affects the beacon transmission ranges. As described herein, the beacon distribution server 240 may determine beacon distribution or relocation of the beacons 220 from one location to another location (e.g., to move beacons 220 from an over-covered area to an insufficiently covered area).

The beacon distribution server 240 may output beacon placement information and beacon distribution information. For example, referring to FIG. 9, the beacon distribution server 240 may output a message (e.g., as shown in interface 900) indicating that a particular beacon 220 (e.g., beacon #231) should be move from one location (e.g., the jewelry department) to another location (e.g., the shoe department). While not shown in FIG. 9, the beacon distribution server

240 may also output a floor plan identifying the locations in which to relocate beacons 220.

Figure 10:
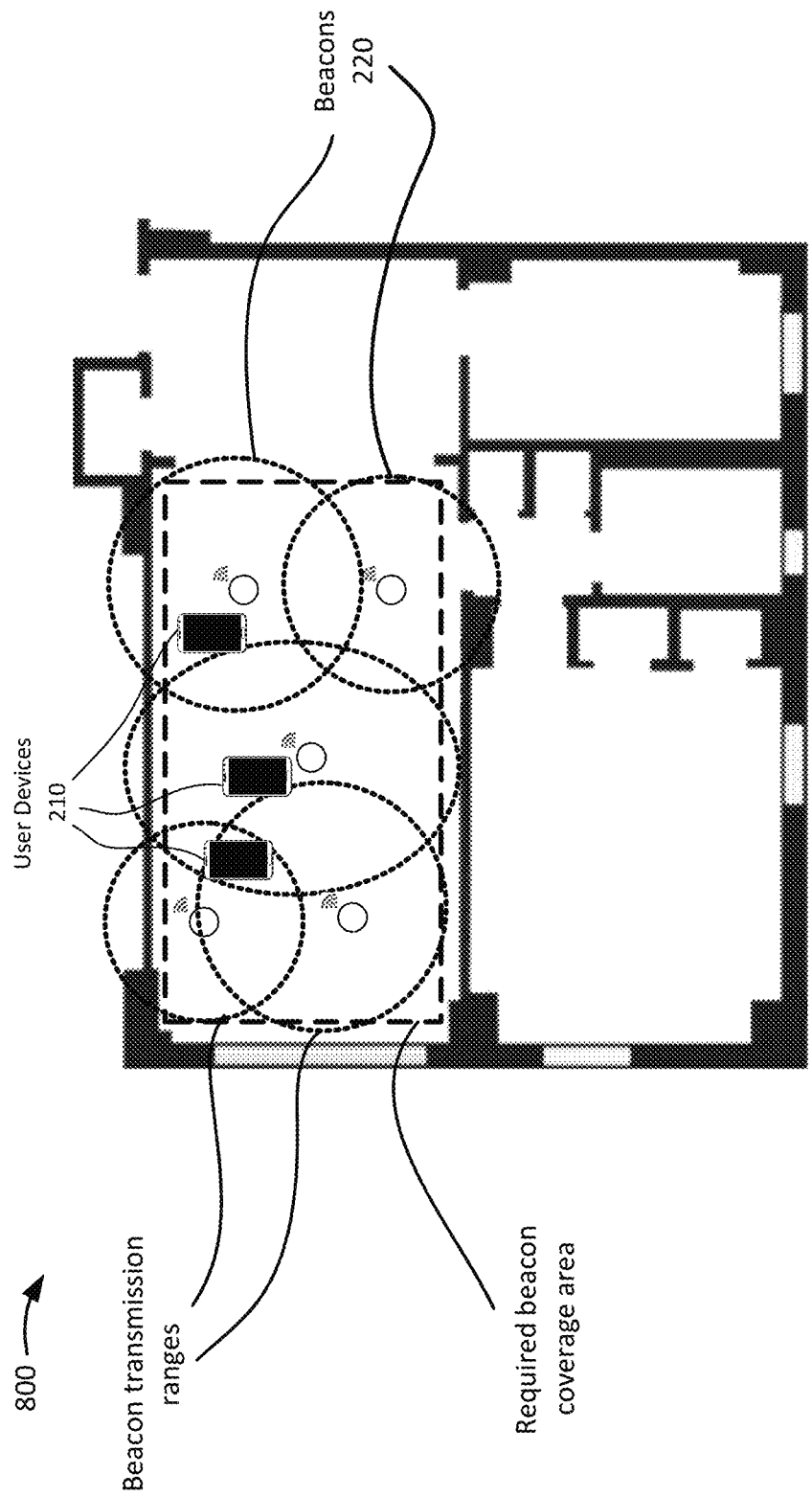

FIG. 10 shows an example illustration of beacon transmission ranges in relation to a required beacon coverage area after redistribution of the beacons from the initial configuration shown in FIG. 8. As shown in FIG. 10, the floor plan 800 identifies the location of beacons 220 and their respective beacon transmission ranges (e.g., as stored by the beacon transmission range information repository 540) after the beacons 220 have been redistributed. In embodiments, the information of FIG. 10 may be provided for display by the beacon distribution server 240. As can be seen from FIG. 10, the beacon transmission ranges now cover the required beacon coverage area. As a result, user devices 210 in the required beacon coverage area may receive beacon signals and, in turn, obtain content when located in the required beacon coverage area (e.g., the message shown in FIG. 7). In this way, an administrator may update or modify target areas for ad campaigns (e.g., target areas in which content should be provided) and also receive information on how to distribute beacons in order to cover the targeted area. Further, factors such as battery levels and/or historical beacon transmission performance at various locations may be considered when determining beacon placement and beacon distribution. As a result, optimal beacon placement and distribution may be determined.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

receiving, by a computing device, information defining a beacon coverage area in which beacon signals transmitted by one or more physical beacon devices traverse the beacon coverage area;

determining, by the computing device, the beacon coverage area based on the information;

determining, by the computing device, a beacon distribution of the one or more physical beacon devices based on the determined beacon coverage area by executing a simulation based on a historical beacon transmission performance of the one or more physical beacon devices;

displaying, by the computing device, the beacon distribution with a narrative, a report, and an instruction indicating a manner in which the one or more physical beacon devices should be distributed; and generating, by the computing device, an instruction to relocate a particular physical beacon device of the one or more physical beacon devices based on the beacon distribution, the information, and a default beacon coverage area, wherein:

the information includes a battery level for the one or more physical beacon devices and the historical beacon transmission performance at various locations for the one or more physical beacon devices, the beacon coverage area is set to expire and revert to the default beacon coverage area, and a revised beacon distribution is determined based on the default beacon coverage area.

2. The method of claim 1, wherein the beacon coverage area is a section of a merchant facility.

3. The method of claim 1, wherein the beacon coverage area is changed, and an updated beacon distribution is determined based on the changed beacon coverage area.

4. The method of claim 1, further comprising determining beacon placement based on the determined beacon coverage area, wherein the storing or outputting further includes storing or outputting information regarding the beacon placement.

5. The method of claim 1, further comprising deploying a system for distributing and placing the physical beacon devices in a facility to provide beacon coverage within the beacon coverage area, comprising providing a computer infrastructure operable to perform the steps of claim 1.

6. A computer program product for distributing and placing physical beacon devices in a facility to provide beacon coverage within a beacon coverage area, the computer program product comprising a computer readable storage medium having program instructions embodied therewith, the program instructions executable by a computing device to cause the computing device to:

receive information for defining the beacon coverage area in which beacon signals transmitted by one or more of the physical beacon devices traverse the beacon coverage area, wherein respective ones of the beacon signals include information representing respective identifiers of the one or more physical beacon devices;

determine the beacon coverage area based on the information;

determine a beacon placement of the physical beacon devices based on the determined beacon coverage area by executing a simulation based on a historical beacon transmission performance of the one or more physical beacon devices;

display the beacon placement with a narrative, a report, and an instruction indicating a manner in which the one or more physical beacon devices should be distributed;

generate an instruction to relocate a particular physical beacon device of the one or more physical beacon devices based on the beacon placement and the information, wherein the information includes a battery level information for the one or more physical beacon devices and the historical beacon transmission performance at various locations for the one or more physical beacon devices;

associate content with one of the respective identifiers;

receive the one of the respective identifiers; and in response to the receiving the one of the respective identifiers, provide the content associated with the one of the respective identifiers to a user device, wherein the beacon coverage area is set to expire and revert to the default beacon coverage area, and a revised beacon distribution is determined based on the default beacon coverage area.

7. The computer program product of claim 6, wherein the information defining the beacon coverage area includes an administrator-defined beacon coverage area.

8. The computer program product of claim 6, wherein the simulation includes superimposing boundaries corresponding to beacon transmission ranges on to a floor plan or map that defines the beacon coverage area.

9. The computer program product of claim 6, further comprising program instructions to cause the computing device to receive a beacon identifier and provide content corresponding to the beacon identifier.

10. The computer program product of claim 6, wherein the generating of the instruction includes providing a narrative identifying the instruction to relocate the particular physical beacon device from one location to a different location.

11. The computer program product of claim 6, wherein a user device receives content based on receiving the beacon signals when located within the beacon coverage area.

12. The computer program product of claim 6, wherein a service provider at least one of creates, maintains, deploys and supports the computing device.

13. The computer program product of claim 6, wherein steps of claim 6, are provided by a service provider on a subscription, advertising, and/or fee basis.

14. The computer program product of claim 6, wherein the computing device includes software provided as a service in a cloud environment.

15. A system comprising:
a CPU, a computer readable memory and a computer readable storage medium associated with a computing device;
program instructions to receive information for defining a beacon coverage area in which beacon signals transmitted by one or more physical beacon devices traverse the beacon coverage area, wherein respective ones of the beacon signals include information representing respective identifiers of the one or more physical beacon devices;
program instructions to determine the beacon coverage area based on the information for defining the beacon coverage area;
program instructions to determine a beacon distribution of the physical beacon devices based on the determined beacon coverage area by executing a simulation based on a historical beacon transmission performance of the one or more physical beacon devices;
program instructions to display the beacon placement with a narrative, a report, and an instruction indicating a manner in which the one or more physical beacon devices should be distributed;
program instructions to generate an instruction to relocate a particular physical beacon device of the one or more physical beacon devices based on the beacon distribution and the information, wherein the information includes a battery level for the one or more physical beacon devices and the historical beacon transmission performance at various locations for the one or more physical beacon devices;
program instructions to associate content with one of the respective identifiers;
program instructions to receive the one of the respective identifiers from a user device; and
program instructions to, in response to the receiving the one of the respective identifiers, provide the content associated with the one of the respective identifiers to the user device, wherein:
the beacon coverage area is set to expire and revert to the default beacon coverage area,
a revised beacon distribution is determined based on the default beacon coverage area, and
the program instructions are stored on the computer readable storage medium for execution by the CPU via the computer readable memory.

16. The system of claim 15, wherein the information includes an administrator-defined beacon coverage area.

17. The system of claim 15, wherein the simulation includes superimposing boundaries corresponding to beacon transmission ranges on to a floor plan or map that defines the beacon coverage area.

18. The method of claim 1, further comprising predicting, by the computing device, user traffic based on sales activity within a merchant facility where the one or more physical beacon devices are located.

19. The method of claim 18, wherein the determining the beacon coverage area is further based on the predicted user traffic.

* * * * *